Jan. 22, 1957    O. K. AUSTIN    2,778,715
CARBON BLACK COLLECTING SYSTEM EMPLOYING ORLON BAG FILTERS
Filed Nov. 13, 1953
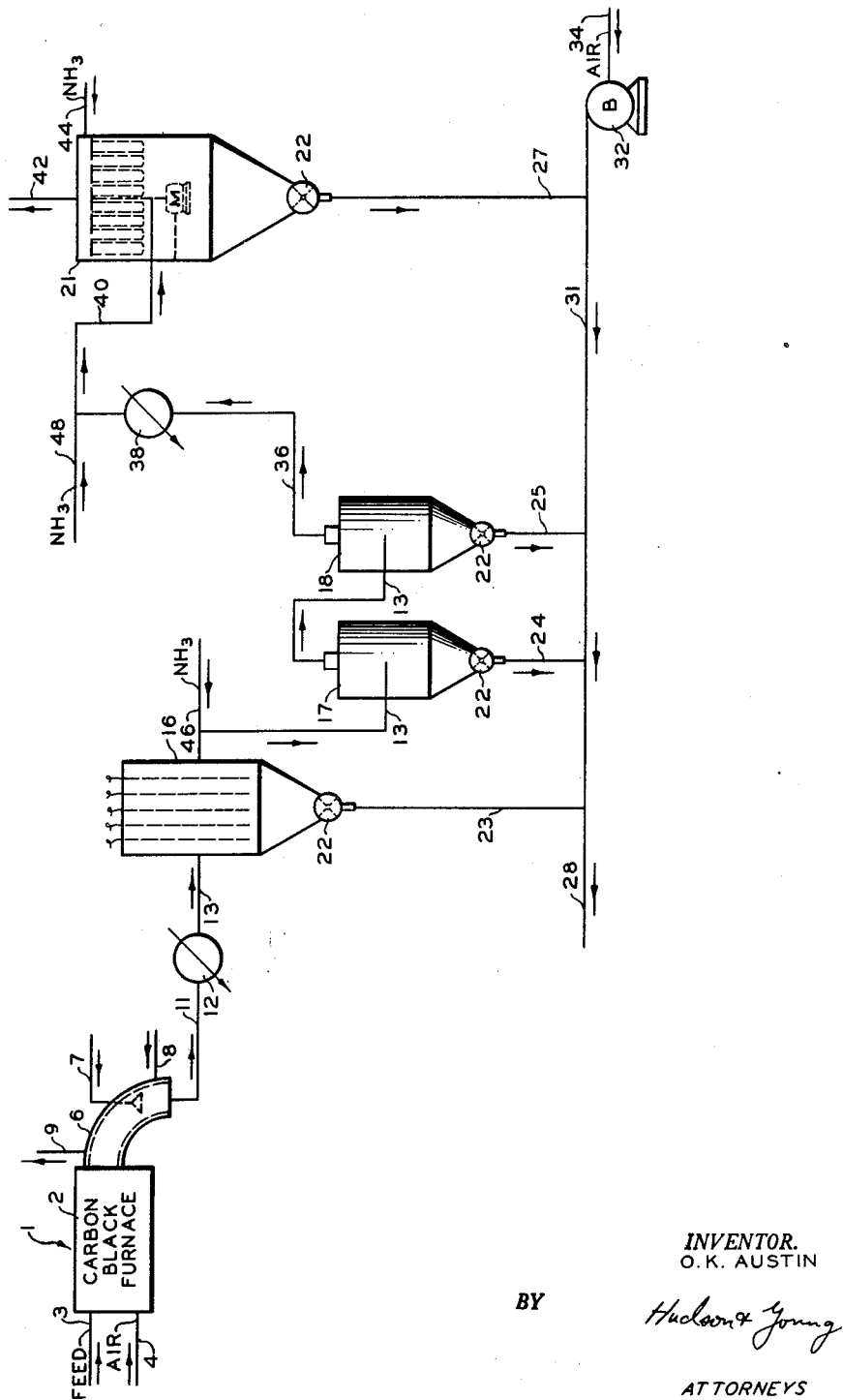
INVENTOR.
O.K. AUSTIN
BY
*Hudson & Young*
ATTORNEYS

United States Patent Office 2,778,715
Patented Jan. 22, 1957

2,778,715

CARBON BLACK COLLECTING SYSTEM EMPLOYING ORLON BAG FILTERS

Oliver K. Austin, Borger, Tex., assignor to Phillips Petroleum Company, a corporation of Delaware Application November 13, 1953, Serial No. 391,934

20 Claims. (Cl. 23—209.9)

This invention relates to a process and a system for collecting carbon black. In a further aspect this invention relates to a process for separating carbon black from the hot gaseous effluent from a carbon black furnace. In another aspect this invention relates to an improved carbon black collecting system utilizing a bag filter zone for the purpose of smoke abatement.

In the art of producing carbon black in furnaces, a hot gaseous effluent containing suspended carbon black is produced at temperatures generally in the neighborhood of 1200° F., although at some points in the furnace during the carbon black making process temperatures as high as 2000° F. to 4000° F. may be attained. It is extremely difficult to separate this suspended carbon black from the effluent gases, especially if it is attempted to achieve this separation in one step. As a result most plants separate the carbon black in a series of steps, it being common to cool the gaseous effluent to about 400° F., and then run the same in series through a plurality of separation means, such as first through an electrical precipitator, then through primary, secondary and tertiary cyclone separators. In order to recover the greatest amount of carbon black that is possible and also in order to be a good neighbor, the carbon black industry now adds a fifth step, chiefly for the purpose of smoke abatement, which is to pass the gaseous effluent through cloth or fabric bags. Such fabrics are textiles, such as wool, woven glass and fabrics woven from synthetic fibers. Such a bag filter zone is often substituted for the tertiary cyclone separator.

Bag filter zones are well known in the art and an especially useful fabric for this purpose is a fabric woven from the synthetic fiber, Orlon. However, the use of Orlon bags in the bag filter zone has presented unusual problems to the industry, along with affording increased efficiency in smoke abatement.

The main problem stems from the fact that the gaseous effluent must be cooled to no higher than 280° F. before the gases enter the Orlon bags in order to prevent damage to the Orlon bags due to heat alone. This allows an increased amount of condensation in the bag filter zone. When a bag filter zone is not used and a tertiary cyclone separator is the final step in the removal of carbon black from the furnace effluent, the effluent gases are seldom cooled below 300° F. and for this reason little condensation occurs in the equipment. It has been found that the Orlon fabric is degrated by excessive heat and the acidic nature of the effluent gases. This degradation manifests itself by weakening and stiffening of the Orlon bags. The latter is especially detrimental because it is customary to shake the bags in order to dislodge particles of carbon black clinging thereto and stiffness interferes with effective shaking of the bags. The result has been that when an Orlon bag filter zone is used, the temperature of the effluent gases entering the bag filter zone is maintained at a maximum of 280° F. usually from 250 to 270° F. This lowered temperature, while considerably above the dew point of the gases, results in an increased amount of condensation, and resultant corrosion, in the separation equipment and particularly in the bag filter zone due to stagnation of the gases in certain parts of the equipment.

The source of the acidity in the effluent gases from the carbon black furnace is the oxides of sulfur and carbon and hydrogen sulfide, sulfur dioxide being the most detrimental. An average oil feed to a carbon black furnace contains from about 0.2 to 5.0 weight percent sulfur, with the normal amount being in the range from 0.3 to 0.4 weight percent sulfur. I have found that the detrimental effect to the separation equipment due to the condensation of the effluent gases, the resulting corrosion, and the stiffening of the Orlon bags can be reduced greatly by injecting an organic amine or ammonia into the effluent gases from the carbon black furnace. Furthermore, and most surprising, I have found that condensates with basic pH values are formed when the organic amine or ammonia is injected at a rate which is only about 5 to 30 percent, preferably about 20 percent, of the theoretical requirement for reaction with all of the available sulfur, and that this amount is at the same time sufficient to prevent the Orlon bags from being degrated by the effluent gases.

One object of the present invention is, therefore, to provide an improved process for collecting carbon black.

Another object is to provide an improved process for separating carbon black from the effluent gases from a carbon black furnace wherein a bag filter zone is used.

Another object is to provide an improved process for the removal of carbon black from the effluent gases from a carbon black furnace wherein Orlon bags are used in a bag filter zone.

Other objects and advantages will be apparent to those skilled in the art upon reading the accompanying specification and drawing.

The single figure in the drawing is a diagrammatic elevation of a carbon black manufacturing plant embodying the present invention with the various pieces of apparatus shown by conventional symbols.

In the drawing a carbon black furnace generally designated as 1, can be any of the many types of carbon black furnaces which produce a hot gaseous effluent containing suspended carbon black. A furnace chamber 2 can produce the carbon black from any carbonaceous material, usually gaseous or liquid hydrocarbons, shown entering as feed at 3, by any one of a number of pyrochemical processes, such as exposing to radiant heat alone, incomplete combustion of the feed, or exposure to hot combustion gases with or without partial incomplete combustion with heated free oxygen containing such gas as air, introduced through line 4. The furnace 1 may, if desired include a quench section 6, because in some processes the quality of the carbon black is improved by stopping the reaction more or less rapidly with a direct water spray injection. Quench section 6 may merely be indirect heat exchange with the atmosphere but in the drawing a direct water spray quench 7 is shown which quenches the effluent rapidly down to about 1100° F. If desired, there may be indirect heat exchange with cold water coming in through pipe 8 passing through a jacket surrounding quench section 6 and emerging as warm water or steam through pipe 9.

The gaseous effluent in pipe 11 generally is about 1100° F. as indicated. This temperature is somewhat hotter than is conducive to long life and proper operation of the usual carbon black separation means and it is conventional to cool the same to the neighborhood of 400° F., before separating the carbon black out, by indirect heat exchange with the atmosphere or other fluids at 12, which may merely consist of a long pipe exposed to the air, and/or by further direct injection of water spray (not shown) so that the gaseous effluent entering pipe 13 has a temperature in the neighborhood of 400° F.

The effluent gases containing the suspended carbon black are then passed through a separation system including a precipitator 16, a series of cyclone separators 17 and 18, and a bag filter 21, each one for separating some of the carbon black from the effluent gases. Many types of separation systems are known in the art and the units of the system can be arranged in any desired configuration. One particularly effective combination is the one illustrated.

In the lower portion of each of the separators 16, 17, 18 and 21 is located a conventional gas lock valve or chemical feeder device 22, which may be a star valve as conventionally shown in the drawings by a symbol. This star valve is a device similar to a revolving door, each section of which takes a measured amount of carbon black deposited as a powder in the bottom of the respective separators 16, 17, 18 or 21, and in revolving passes it to the respective outlet conduit such as 23, 24, 25 and 27, generally by gravity. In order to collect the carbon black from each of the conduits, 23, 24, 25 and 27, and convey the same to a central point of collection or storage, designated as 28, a collection conduit 31 is provided, connected to each of said outlet conduits. Collection conduit 31 can comprise any of the well known devices for conveying powdered solid material and a blower 32 supplied by air at 34 is located and connected to conduit 31 upstream of the connections to the outlet conduits, thus providing a means for pneumatically transporting the carbon black through conduit 31.

According to the invention, an Orlon bag filter zone is used, and the effluent gases are taken overhead from separator 18, through conduit 36 and through a cooler 38, which can be a direct injection of water spray (not shown), so that the gaseous effluent entering conduit 40 has a temperature of not higher than 280° F. The effluent gases are passed through conduit 40 to the bag filter zone 21 which is schematically shown, and contains a motor M for shaking the bags and thereby dislodging the particles of carbon black. The effluent gases are usually vented to the atmosphere from the top of the bag filter zone 21, as through vent 42.

In accordance with my invention an organic amine or ammonia, preferably the latter, is injected into the effluent gases in the bag filter zone downstream of the bags at 44, as well as at other points, not shown, which may be necessary. The ammonia is also injected downstream of the precipitator 16, as at 46 and downstream of cooler 38, as at 48.

When consideration was first given to adding ammonia to the effluent gases, it was estimated that 50 to 60 pounds of ammonia per hour would be required in a plant which produced 250,000 to 300,000 pounds of carbon black per day. However, it was found that the pH of condensate formed in the bag filter zone was raised from about 3.5 to between 5 and 6 by an addition of 5 pounds of ammonia per hour. Furthermore, it has been found that the pH of condensate formed in the bag filter zone is raised from about 3.5 to between 6 and 8 by an addition of 11 pounds of ammonia per hour.

In addition to ammonia, organic amines can be used so long as they meet the requirement of being volatilizable at the temperature of the gases in conduit 40, i. e., so long as they have a boiling point of less than 250° F. Such amines are the primary amines, for example, methylamine, ethylamine, propylamine, and sec-butylamine, the secondary amines, such as dimethylamine, diethylamine, dipropylamine and diisopropylamine. Also the tertiary amines are effective, such as trimethylamine and triethylamine, as well as polyamines and cyclic amines such as ethylenediamine and piperidine.

In a carbon black plant where approximately 110,000 cubic feet per minute of effluent gases are charged to a bag filter zone having Orlon bags, it has been found that the addition of from 3 to 15 pounds per hour of ammonia, preferably from 5 to 12 pounds per hour of ammonia, raised the pH of any condensate formed from approximately 3.5 to the range of 5 to 8. The amount of ammonia or organic amine used necessarily will depend on independent operating conditions but it is preferred that a sufficient amount be used to maintain the pH of any condensate formed in the range of 4 to 8, more preferably from 5 to 7.

While the points of injection of the ammonia or organic amine into the effluent gases have been described in connection with a preferred embodiment of my invention, various other points of injection throughout the carbon black separating system can be used for the purpose of raising the pH of any condensate formed and thereby preventing corrosion of the equipment. However, it is believed that it is most important, when using Orlon bag filters, to inject the ammonia or organic amine directly into the bag filter zone itself in order to obtain the important advantages of preventing stiffening and weakening of the Orlon bags as well as preventing corrosion in the bag filter zone.

While certain specific embodiments of the invention have been discussed and shown in the specification and drawings for purposes of illustrating the invention, the invention is not limited thereto.

Having described my invention, I claim:

1. In a process for recovering carbon black from a hot gaseous effluent from a carbon black furnace wherein said effluent is passed through a plurality of cooling and carbon black separating zones, and the carbon black so separated is recovered, the improvement which comprises injecting into said effluent a member selected from the group consisting of aliphatic amines having boiling points below 250° F., piperidine and ammonia.

2. In a process for recovering carbon black from a hot gaseous effluent from a carbon black furnace wherein said effluent is passed through a plurality of cooling zones, carbon black separating zones, an Orlon bag filter zone, and the carbon black so separated is recovered, the improvement which comprises injecting into said effluent a member selected from the group consisting of aliphatic amines having boiling points below 250° F., piperidine and ammonia.

3. A process according to claim 2 wherein said member is ammonia.

4. A process according to claim 2 wherein said member is methylamine.

5. A process according to claim 2 wherein said member is an aliphatic amine having a boiling point below 250° F.

6. A process according to claim 5 wherein said aliphatic amine is a lower alkyl-substituted amine having a boiling point below 250° F.

7. A process for recovering carbon black from a hot gaseous effluent from a carbon black furnace which comprises cooling said effluent in a first cooling zone, separating carbon black from said effluent in an electrical precipitator zone, injecting ammonia into said effluent downstream of said precipitator, passing said effluent through a plurality of cyclone separator zones, cooling said effluent in a second cooling zone, injecting ammonia into said effluent downstream of said cooling zone, passing said effluent through an Orlon bag filter zone, injecting ammonia into said Orlon bag filter zone, and recovering the carbon black so separated.

8. A process according to claim 7 wherein said gaseous effluent from said furnace is approximately 1100° F., wherein said effluent is cooled to approximately 400° F. in said first cooling zone and wherein said effluent is cooled to a maximum of 280° F. in said second cooling zone.

9. In a process for recovering carbon black from a hot gaseous effluent from a carbon black furnace wherein carbon black is manufactured from a sulfur-containing oil feed, wherein said effluent is passed through a plurality of cooling and separating zones, including an Orlon bag filter zone, and the carbon black so separated is recovered, the improvement of preventing corrosion due to condensation of said effluent in said filter zone and of preventing degradation of the Orlon bags in said filter zone which comprises injecting ammonia into said Orlon bag filter zone.

10. A process according to claim 9 wherein the temperature of said effluent is a maximum of 280° F. as it is passed into said Orlon bag filter zone.

11. A process according to claim 10 wherein said injection of ammonia downstream of the bags in the bag filter zone and is in an amount of about 20 percent of the amount theoretically required to react with the sulfur in the feed.

12. A process according to claim 10 wherein said effluent is passed through said bag filter zone at a rate of approximately 110,000 cubic feet per minute and wherein said injection of ammonia is at a rate in the range from 3 to 15 pounds per hour.

13. In a process for recovering carbon black from a gaseous effluent from a carbon black furnace, wherein carbon black is manufactured from a sulfur-containing oil feed, wherein said effluent is cooled in a first cooling zone, wherein the resulting cooled effluent is passed through an electrical precipitating zone, wherein the effluent emerging from said electrical precipitating zone is passed through a plurality of cyclone separator zones, wherein the effluent emerging from said cyclone separator zones is passed through a second cooling zone, wherein the effluent emerging from said second cooling zone is passed through an Orlon bag filter zone, and wherein carbon black is recovered from said electrical precipitating zone, and cyclone separator zones and said Orlon bag filter zone, the improvement of preventing corrosion in said filter zone due to condensation of said effluent therein and of preventing degradation of the Orlon bags in said filter zone which comprises injecting a member selected from the group consisting of aliphatic amines having boiling points below 250° F., piperidine and ammonia into said bag filter zone, the amount of said member so injected being in the range of 5 to 30 percent of the amount theoretically required to react with the sulfur in the feed.

14. A process according to claim 13 wherein said member is methylamine.

15. A process according to claim 13 wherein said member is dimethylamine.

16. A process according to claim 13 wherein said member is trimethylamine.

17. A process according to claim 13 wherein said member is ethylamine.

18. A process according to claim 13 wherein said member is ammonia.

19. A process according to claim 18 wherein the temperature of the effluent emerging from said second cooling zone is not higher than 280° F.

20. In a process for recovering carbon black from a hot gaseous effluent from a carbon black furnace wherein said effluent is passed through a plurality of cooling zones, and carbon black separating zones, including a bag filter zone, said effluent containing materials which are deleterious to recovery equipment, and the carbon black so separated is recovered, the improvement which comprises injecting into said effluent prior to its final emergence from said zones a member selected from the group consisting of aliphatic amines having boiling points below 250° F., piperidine and ammonia thus counteracting the deleterious nature of said materials.

References Cited in the file of this patent

UNITED STATES PATENTS

| | | |
|---|---|---|
| 1,730,485 | Teague | Oct. 8, 1929 |
| 2,292,355 | Ayers | Aug. 11, 1942 |

OTHER REFERENCES

Paulsen: "Instrumentation," vol. 6, No. 6, 1953, pages 35–37.

Dupont Orlon Acrylic Fiber Technical Manual, pages 2–4.04, 2–6.01, 2–6.03, 2–6.04, Textile Fiber Dept., E. I. du Pont de Nemours and Co., Wilmington 98, Delaware.